J. HOPKINSON.
SPRING BALANCE SCALE.
APPLICATION FILED FEB. 5, 1912.
1,065,808.
Patented June 24, 1913.
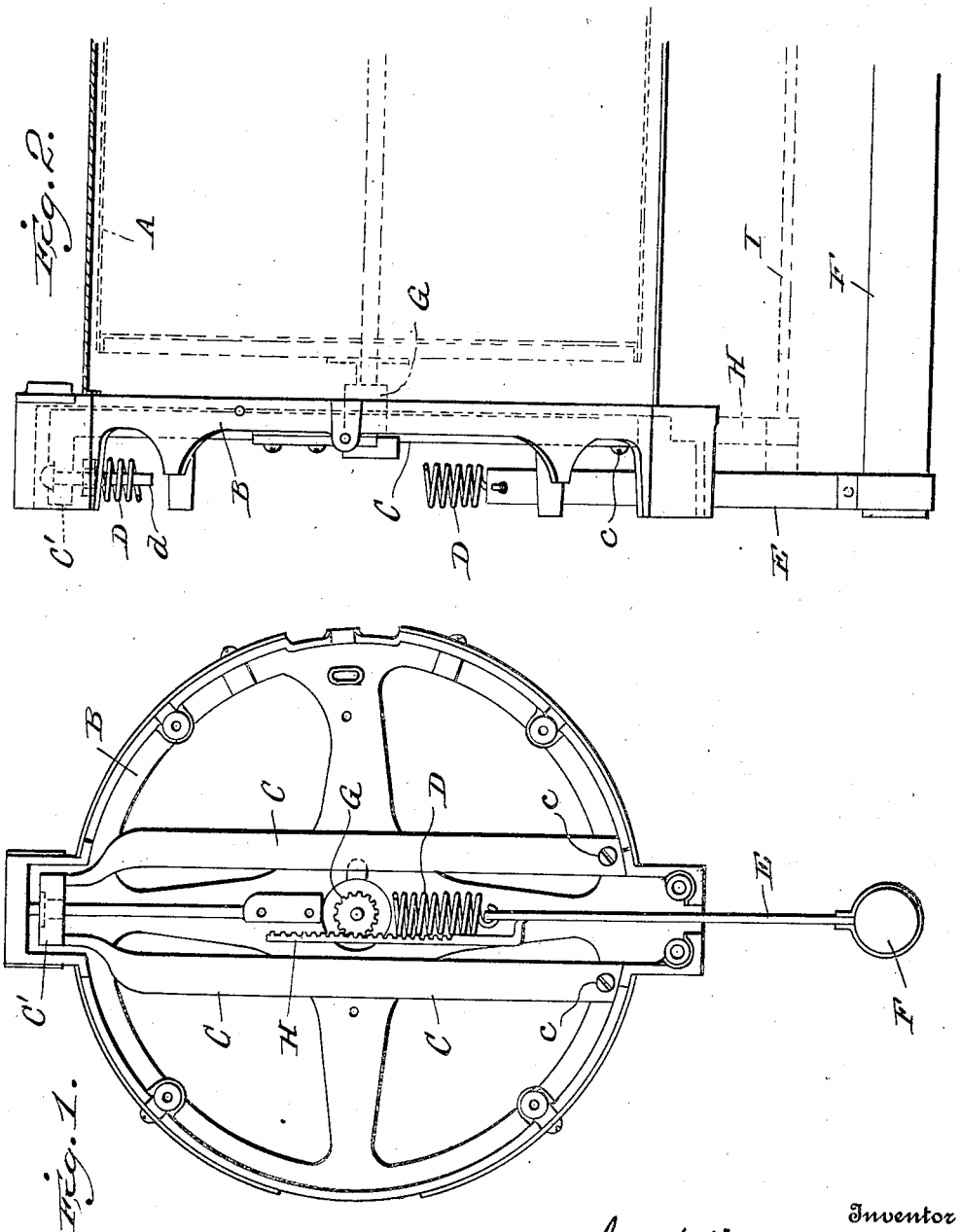

UNITED STATES PATENT OFFICE.

JOSEPH HOPKINSON, OF DAYTON, OHIO.

SPRING-BALANCE SCALE.

1,065,808.  Specification of Letters Patent.  Patented June 24, 1913.

Application filed February 5, 1912. Serial No. 675,605.

*To all whom it may concern:*

Be it known that I, JOSEPH HOPKINSON, a citizen of the United States, residing at Dayton, in the county of Montgomery and State of Ohio, have invented certain new and useful Improvements in Spring-Balance Scales; and I do hereby declare the following to be a full, clear, and exact description of the same, reference being had to the accompanying drawings, forming part of this specification, and to the figures and letters of reference marked thereon.

This invention relates to improvements in spring balance scales and is more especially, though not exclusively, applicable in that type of scales wherein a horizontally arranged rotary drum or chart is employed for indicating the weight or value of an article being weighed on the scale, the weight of the article being counterbalanced by coil springs usually suspended at the ends of the indicating drum and connected therewith through suitable rack and pinion connections adapted to be moved by the draft rod or load support on the scale.

The objects of the invention are to provide a construction whereby the effect of changes in temperature on the zero position and movement of the drum will, to a considerable extent, be overcome or eliminated.

Referring to the accompanying drawings,—Figure 1 is an end elevation of a portion of a scale embodying the present improvements, the end of the casing and certain of the other well understood parts being omitted; Fig. 2 is an elevation showing one of the end frames of the casing illustrating the adaptation of the present improvements thereto, the drum itself and the operating connections being indicated generally in dotted lines.

Like letters of reference in both figures indicate the same parts.

In spring balance scales, particularly in the type illustrated in the accompanying drawings, the counterbalancing springs for the article to be weighed are suspended at the upper ends from a frame in which the rotary drum or indicator is journaled and said springs extend downwardly across the axis of the drum or indicator, their lower ends being connected through suitable horizontal runner frames with the load support or draft rod proper. The indicator or drum is rotated by rack and pinion connections with the runner frame. With this arrangement it is found that, as the temperature rises and falls, the position of the runner frame and indicator varies to a greater or less extent, due primarily to the elongation or shortening of the springs themselves, and any variation in the respect mentioned produces a variation in the position of the indicator, and consequently prevents an accurate indication of the true weight of the article being weighed. The variation from the true value or weight is of course in proportion to the changes produced by the difference between the prevailing temperature and the temperature at which the scale was sealed.

In accordance with the present invention it is proposed to suspend the counterbalancing springs from the upper end or ends of a frame or frames, the spring suspending portions of which will move under the influence of variations in temperature up or down as the case may be, in proportion to the contraction or elongation of the springs and rods directly connected therewith, but in a direction opposite to the direction of movement of the lower ends of the springs or rods connected therewith, under the influence of such changes in temperature. Said spring suspending frames are so associated with the frames in which the indicator is journaled that an accurate normal zero indicating position of the indicator will be maintained when no load is on the scale and when goods are being weighed the movement of the indicator will be to a position or positions which will more accurately indicate the true weight or value of the goods, due allowance, of course, being made for the variation in the flexibility of the springs, produced by changes in temperature.

In said drawings, A indicates the rotary drum or indicator mounted on a central shaft, journaled at the ends in frames B, one only of which is shown in detail in the drawings. Said frames are preferably of circular contour with internal radiating arms, whereby the weight is reduced and whereby effective means are provided both for supporting the drum either by a hanging support connected with the frames, or by a standard or standards on which the frames rest, both constructions being in common use and well understood at this time. The counterbalancing springs, as usually embodied in scales of this type, are suspended directly from the upper portions of the end frames, but in accordance with the present invention supplemental end frames are provided which conveniently take the form of uprights C connected at their lower ends with the lower portion of the end frames as by screws c, and at their upper ends connected together by a bridge portion C'. One of the uprights is located in front and the other in rear of the vertical plane of the spring, and the spring is suspended from the bridge portion C'. This bridge portion C', as shown in Fig. 2, may project laterally from the uprights C, whereby the supplemental frame may be rendered inconspicuous in the scale construction, and its lower ends brought into position for convenient attachment to the lower portion of the end frame. The springs D may be connected with the supplemental frame C by the usual suspension screws d and, at the lower ends they support rods or connections E extending down and forming part of a runner frame F to which the load support is connected by the usual draft rod. The connection with the indicator drum is formed by pinions G on the end portions of the drum shaft, and rack bars H meshing with said pinions extend downwardly through the end frame B and are connected through a transverse rod I with the intermediate portion of the runner frame F, whereby the indicator will be moved in accordance with the movement of the runner frame.

The particular form of the connecting mechanism between the load support and the indicator is of well known construction and it will be understood is illustrated herein simply to show the relative association of the parts of the apparatus forming the gist of the present invention with the scale mechanism, whereby its operation may be more clearly understood.

The supplemental end frames C, which, it will be noted, are supported from the main end frames only at the bottom, are preferably of a metal having a co-efficient of expansion not less than that of the springs, whereby under the influence of changes in temperature the top portions of the supplemental end frames C will move vertically up or down to the same extent that the lower ends of the springs and rods directly supported thereby, will move under the influence of such variations in temperatures, and in the opposite direction with the result that the indicator which is journaled in the main end frames B will be uninfluenced by any changes in temperature and will stand at its normal zero indicating position, when no load is present on the scale.

Having thus described my invention, what I claim as new and desire to secure by Letters Patent of the United States, is:

1. In a spring balance scale, the combination with a rotary indicator, a frame in which said indicator is journaled, a load supporting runner frame, and connections intermediate said runner frame and indicator whereby the indicator is rotated, of a counterbalancing spring, and a rigid supplemental frame from which said spring is suspended having its lower end rigidly connected with the frame in which the indicator is journaled and its upper end free to move vertically under the influence of variations in temperature, with connections intermediate said counterbalancing spring and runner frame.

2. In a spring balance scale, the combination with a rotary indicator, frame in which said indicator is journaled, load supporting runner frame and operating connections intermediate the runner frame and indicator, whereby the indicator is rotated, of a vertically arranged rigid supplemental frame rigidly connected at its lower end with the frame in which the indicator is journaled at a point below the axis of the indicator and extending freely above said axis and a counterbalancing spring suspended from the upper end of said supplemental frame and extending downwardly below the axis of the indicator, with connections intermediate the lower end of the counterbalancing spring and runner frame.

3. In a scale, the combination with the rotary indicator, circular end frame having a central bearing in which said indicator is journaled, load supporting runner frame and operating connections between the runner frame and indicator whereby the indicator is rotated, of a supplemental frame embodying standards connected at their lower ends to the frame in which the indicator is journaled at a point below the axis of the indicator and extending upwardly to a point above the axis of the indicator, a bridge portion connecting said standards at the upper ends, a counterbalancing spring suspended from said bridge portion, and a connection intermediate the lower end of said spring and runner frame.

4. In a scale, the combination with a rotary drum indicator, end frames in which the indicator is journaled, load supporting runner frame and operating connections intermediate the runner frame and indicator, of supplemental frames embodying vertically arranged standards rigidly connected with the end frames at the bottom and projecting upwardly beyond the axis of the indicator, bridge portions connecting the end standards at the upper ends, and projecting laterally therefrom, counterbalancing springs suspended on said laterally projecting bridge portions of the supplemental frames and connections intermediate the lower ends of the springs and runner frame.

JOSEPH HOPKINSON.

Witnesses:
JAMES L. BOURNE,
HELEN A. LEONARD.